United States Patent [19]

Munz

[11] 4,182,434

[45] Jan. 8, 1980

[54] OSCILLATION INSULATOR

[76] Inventor: Erich Munz, 1-Geber, Westrasse 11, 5204 Lohmar, Fed. Rep. of Germany

[21] Appl. No.: 921,189

[22] Filed: Jul. 3, 1978

Related U.S. Application Data

[63] Continuation of Ser. No. 772,463, Feb. 28, 1977, abandoned.

[51] Int. Cl.² .............................................. F16F 7/00
[52] U.S. Cl. ................................... 188/1 B; 64/13
[58] Field of Search .......................... 64/2 R, 4, 13; 181/207–209; 188/1 B; 248/15, 18, 20

[56] References Cited

U.S. PATENT DOCUMENTS 1,948,211  2/1934  Fritz ................................. 188/1 B X
2,499,093  2/1950  Fast ........................................ 64/13

*Primary Examiner*—Duane A. Reger
*Attorney, Agent, or Firm*—Becker & Becker, Inc.

[57] ABSTRACT

An oscillation insulator, especially in the form of a connecting and supporting device between two bodies each of which has rigidly connected thereto a supporting element embedded in viscous-elastic material. The supporting element associated with one of these bodies is located between the other one of the bodies and the supporting element for the last mentioned body. The supporting elements are designed as supporting discs, and the rigid connection between the respective bodies and their pertaining supporting discs is formed by a pull connection, e.g. tension bolts, under the pre-load of the viscous elastic material.

8 Claims, 6 Drawing Figures

OSCILLATION INSULATOR

This is a continuation application of parent application Ser. No. 772,463 filed Feb. 28, 1977 now abandoned.

The present invention relates to an oscillation insulator forming a flange-like connection and supporting device between two bodies, according to which a supporting element each which is embedded in viscous-elastic material is rigidly connected to each of the two bodies while the supporting element respectively associated with a body is located between the other body and its supporting element.

When connecting mobile objects such as pumps to a fixed container wall, it is necessary to provide a body sound insulation and an oscillation insulation. However, also when interconnecting pipes through pipe flanges, the body sound oscillation problem occurs so that also here attempts are made to prevent the body sound and the oscillations in the connecting areas of the pipes.

When mounting mobile objects to a fixed wall, it is known for purposes of insulating the body sound and for oscillation insulation to provide an elastic disc between the mobile article and the fixed wall. This step takes care of the problem of the body sound and oscillation insulation only to a minor extent. Due to the fact that the screw connection extends from the mobile article to the fixed wall, still a bridge for the body sound exists. Similar remarks also apply to the oscillations originating with the mobile article and conveyed to the fixed wall.

When interconnecting pipes through flanges, elastic intermediate elements for instance of rubber material are employed which in the central area are bulged. Such elements which may be suitable for a body sound and oscillation insulation when interconnecting pipes, can be employed only with vertically extending pipes. With horizontally extending pipes, the employment of such element cannot be recommended because the medium conveyed by the pipes deposits in the so-called pockets, and in particular becomes stuck at the exit of the pipes. During the conveying of in particular aggressive fluids, there exists the danger that in view of the residue the elastic element will be destroyed.

It is, therefore, an object of the present invention to provide an insulator for body sound and oscillations, which on one hand will not convey body sound any longer from a mobile object as well as between two pipe flanges, but on the other hand will serve as a genuine insulator for oscillations.

These and other objects and advantages of the invention will appear more clearly from the following specification in connection with the accompanying drawings, in which.

The oscillation insulator according to the present invention which serves as flange-shaped connecting and supporting device between two bodies is characterized primarily in that the supporting elements are designed as supporting discs and that the rigid connection between the bodies and the respective associated supporting disc is designed as a pull connection which is under preload in view of the viscous elastic material. According to the invention, the pull connection comprises bushings connected to the supporting discs and tension bolts screwed into or guided in said bushings. If the oscillation insulator according to the invention is employed as connecting and supporting device between a mobile and a fixed body, the design is according to a further development of the invention such that the tension bolts associated with the fixed body are inserted into the respective bushings and are screwed into the fixed body, and the tension bolts associated with the mobile body are screwed into the pertaining bushings.

The embedding of the two supporting discs in elastic material may be effected in various manners. According to one realization of the invention, the possibility exists that the supporting discs and their bushings are vulcanized into a rubberbed.

According to a second embodiment of the invention, three viscous elastic discs and two supporting discs interposed therebetween are provided while the bushings partially extend through the viscous elastic disc located between the supporting discs, and furthermore extend through the adjacent supporting discs and the viscous elastic disc following said supporting disc.

Figure 1:
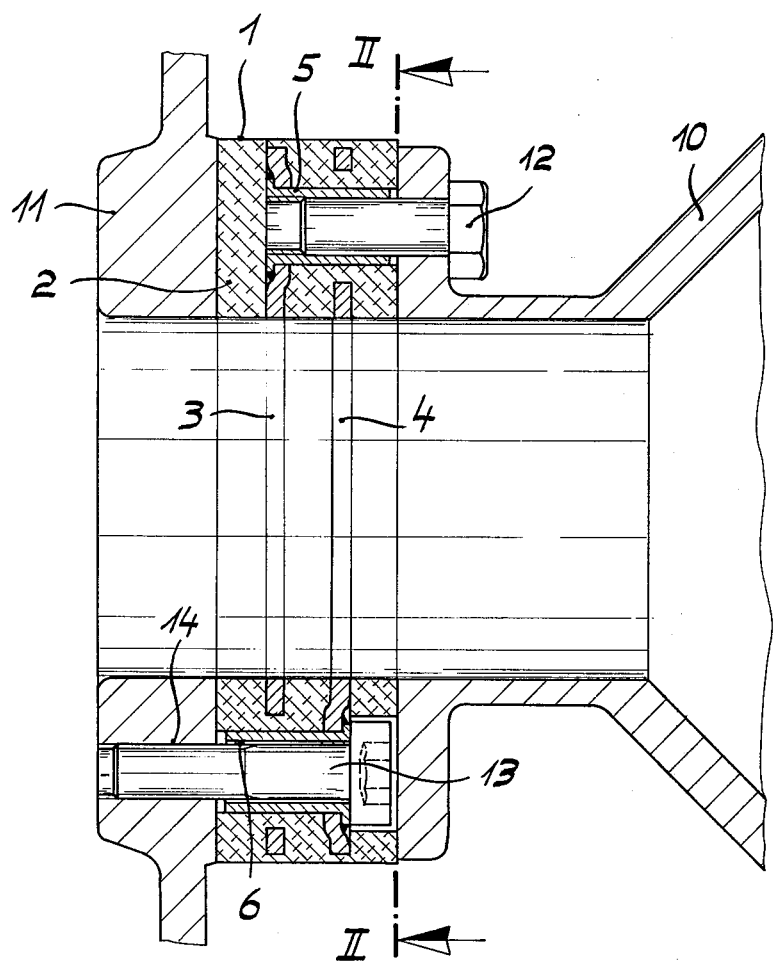
FIG. 1 is a longitudinal section through a connection of a mobile article with a fixed object while employing an oscillation insulator according to the invention, FIG. 1 representing a section along the line I—I of FIG. 2.
Figure 2:
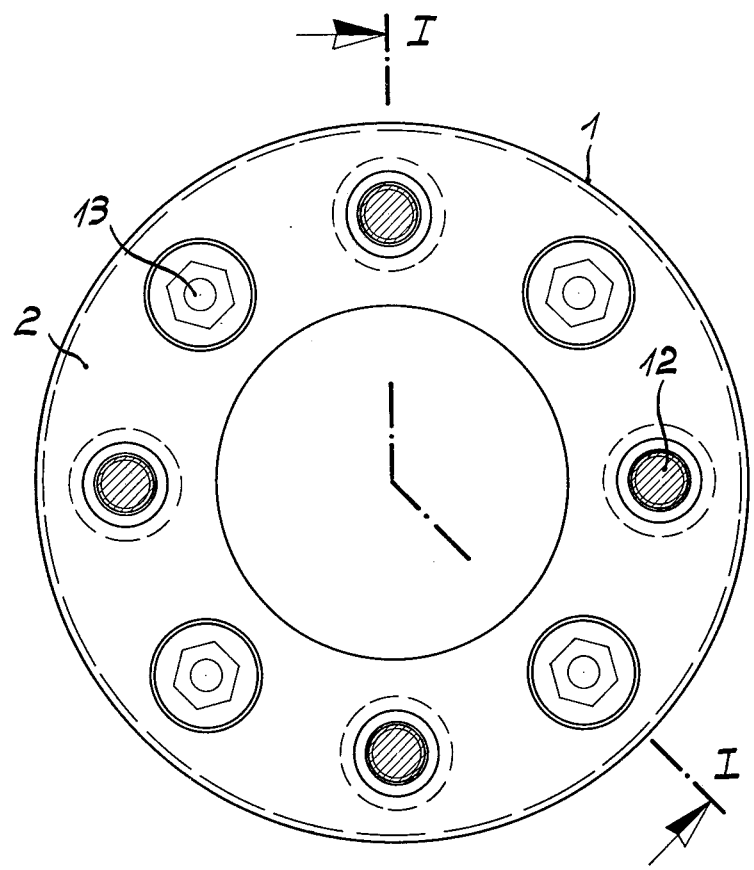
FIG. 2 illustrates a section along the line II—II of FIG. 1.
Figure 3:
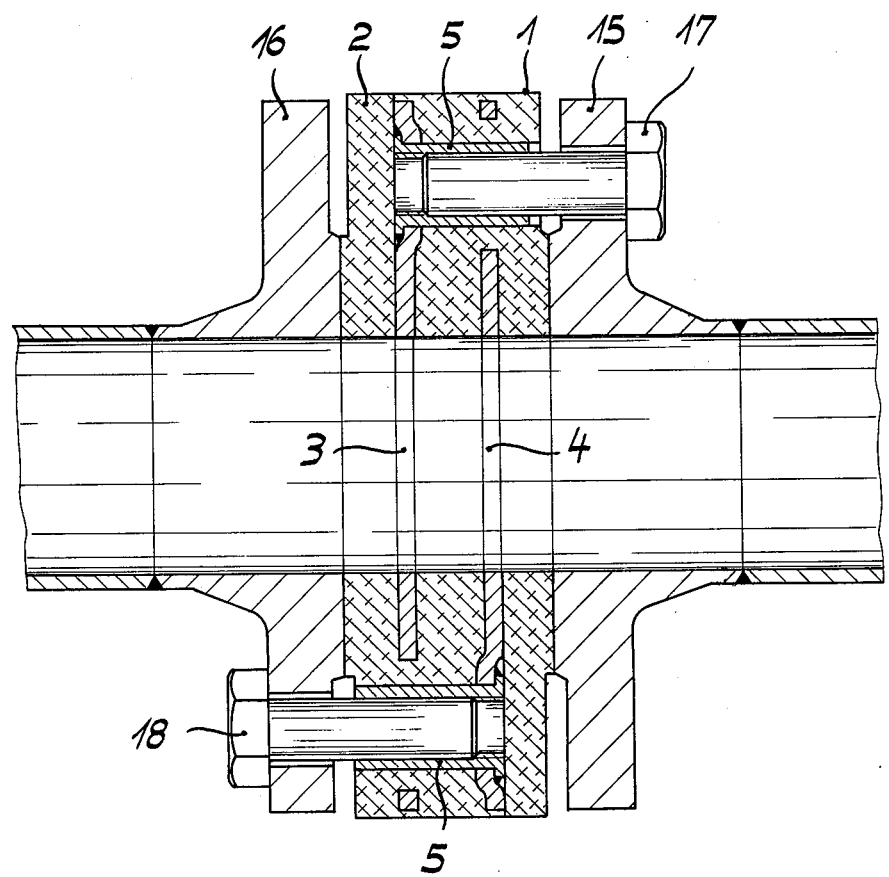
FIG. 3 represents a longitudinal section through a pipe connection while employing an oscillation insulator according to the invention, the section according to FIG. 3 being taken along the line III—III of FIG. 4.

Referring now to the drawings in detail, the oscillation insulator as shown in FIGS. 1 and 3 comprises a disc body 1 of elastic material 2 having embedded therein supporting discs 3,4. Bushings 5, 6 are respectively connected to the supporting discs 3 and 4. In this embodiment, the bushings 5 and 6 are connected by welding to the supporting discs 3 and 4 respectively. The bushings 5 which are connected to the supporting disc 3 have an inner thread. With the bushing 6 of the supporting disc 4, the inner thread is missing. Both supporting discs 3 and 4 and the bushings 5 and 6 may be vulcanized into a rubber bed.

The oscillation insulator according to FIG. 3 is of the same design as that of FIG. 1 with the sole difference that all bushings 5 are provided with inner thread.

Figure 5:
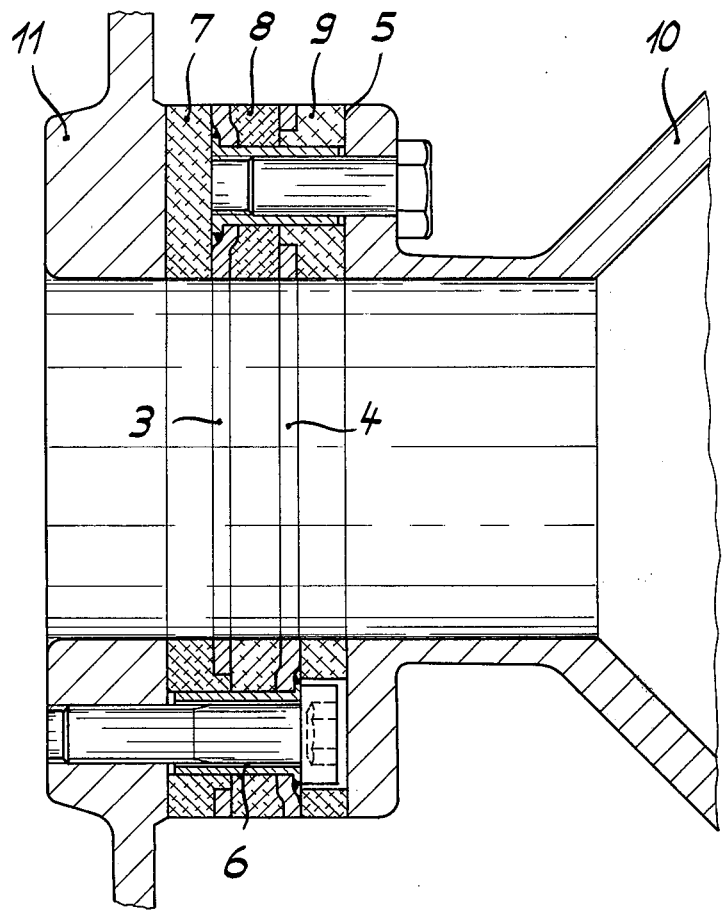
FIG. 5 shows the same connection as it is represented in FIG. 1, while employing an oscillation insulator according to the invention which comprises at least three discs of elastic material and two supporting discs located therebetween.
Figure 6:
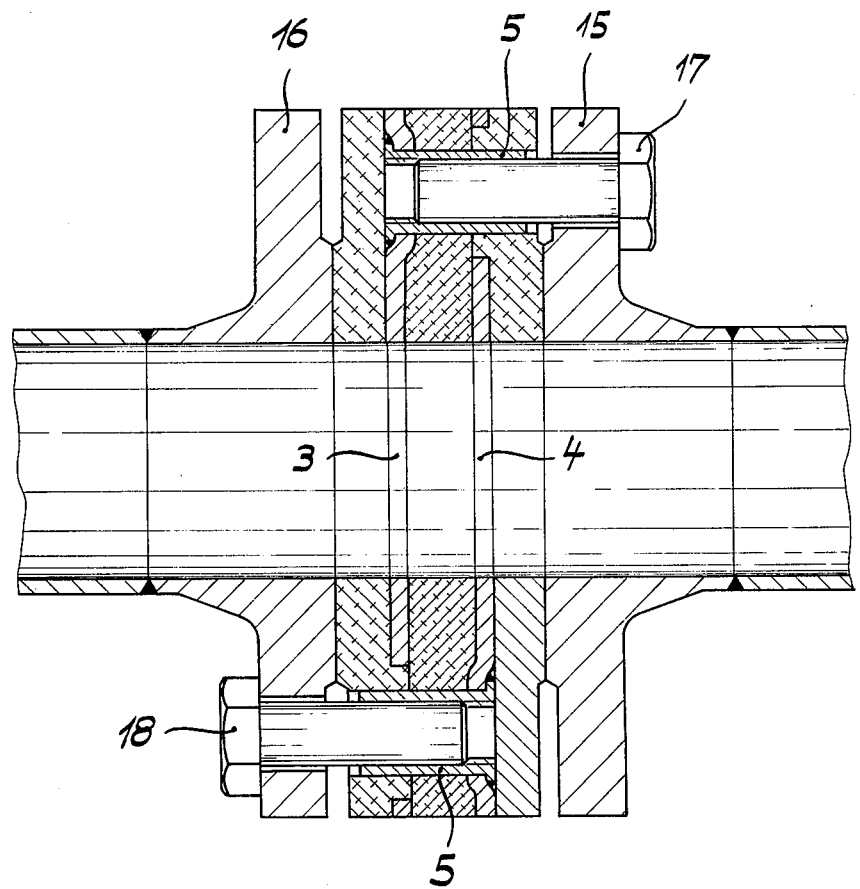
FIG. 6 shows the same connection as is illustrated in FIG. 3 but with an oscillation insulator according to the invention as shown in FIG. 5.

A further embodiment of the invention of the oscillation insulator is shown in FIGS. 5 and 6. The oscillation insulator shown in FIGS. 5 and 6 comprises three viscous elastic discs 7,8,9 between which the supporting discs 3 and 4 are inserted.

The fundamental structure of the oscillation insulator according to the invention as shown in FIGS. 5 and 6 is the same. The difference consists merely in the bushings. While the bushings 5 of the embodiment of FIG. 5 are provided with inner thread and the bushings 6 of the embodiment of FIG. 5 are without thread, it will be seen that with the embodiment of FIG. 6 all bushings 5 are provided with inner thread.

FIG. 1 shows the embodiment of the oscillation insulator according to the invention in combination with the mounting of a mobile object 10 to a fixed wall. The mobile object is held to the supporting disc by means of the tension bolts 12 which engage the inner thread of bushing 5. The oscillation insulator itself is by means of tension bolts 13 passed through bushing 6 held in a thread 14 in the fixed wall.

When employing oscillation insulators according to the invention as connecting element between two pipe flanges 15 and 16, the screws 17 and 18 are respectively passed through the bushings 5 with inner thread, while the screws 17 engage the bushings 5 of disc 3, and the bushings 18 engage the bushings 5 of the supporting disc 4.

As will be seen from all longitudinal sections of the embodiments according to the invention, the bushings 5, 6 end in front of the end faces. In this way, it will be assured that the elastic disc body or also the individual discs can be compressed and that due to the compression a clean seal will be realized.

Figure 4:
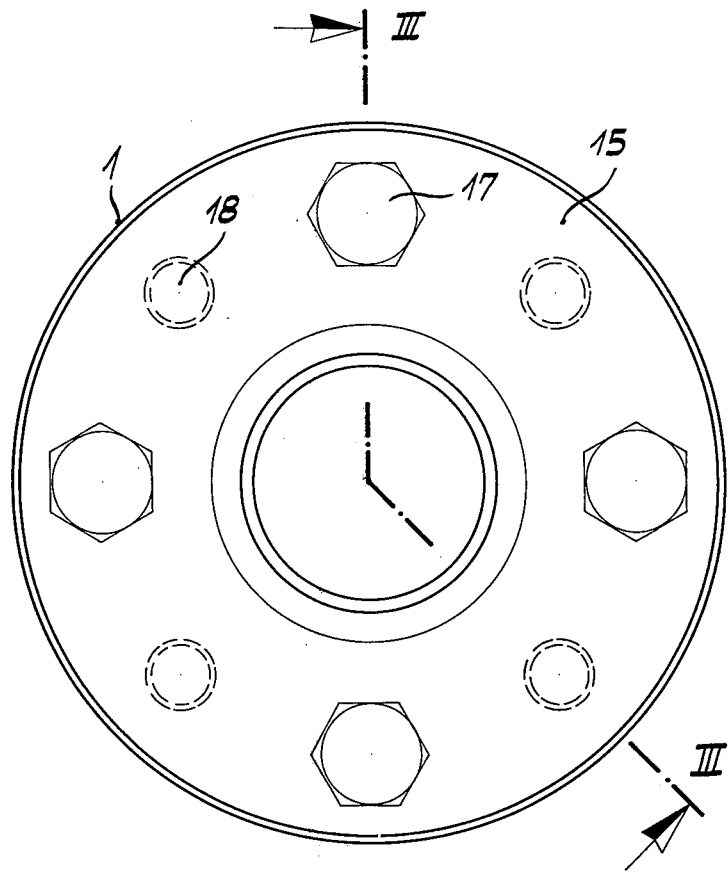
FIG. 4 is a front view of FIG. 3.

FIG. 4 shows how a mobile object 10 is connected to a fixed wall 11 by means of the oscillating insulator according to the invention. The difference consists merely in the design of the elastic material which with the insulator of FIG. 5 consists of three individual discs 7, 8, 9 as mentioned above.

FIG. 6 again shows the employment of the oscillation insulator according to the invention as connecting element between two pipe flanges 15 and 16. While the design of the oscillating insulator differs from that of FIG. 3, the connecting method is the same.

It will be obvious that as elastic material a number of basic materials can be employed. In this connection, rubber material has proved particularly advantageous. Such rubber material can be vulcanized not only between the supporting discs 3 and 4 but also in the form of an individual disc. However, also elastic synthetic material of any suitable type may be employed in this connection.

As will be evident from the above, the advantages according to the present invention consist primarily in that for instance the mobile object which is fastened to a fixed wall is exclusively frictionally connected to a disc which has no connection to the fixed wall. Similar remarks apply to the connection of the oscillation insulator with the fixed wall. Thus, it is no longer possible that object body sound is conveyed to the fixed wall because between the mobile object and the fixed wall no longer any bridge exists which may convey the sound of the body. The same applies to possible oscillations originating with the mobile object. The two discs practically float in the elastic material without conveying the body sound or oscillation. Similar advantages are realized when the two supporting discs are not embedded in an elastic bed, for instance by vulcanizing but when the elastic material consists of individual discs between which the supporting discs are arranged. In installed condition of operation, power systems act upon the oscillation insulator according to the invention which power systems partially cancel each other out and cause only slight stresses. In this way, also an extremely low wear in the condition of operation is encountered.

It is, of course, to be understood that the present invention is, by no means, limited to the specific showing in the drawings, but also comprises any modifications within the scope of the appended claims.

What I claim is:

1. An oscillation insulator as a flange-type connection and supporting device to isolate sound without encountering any rotary movement, comprising in combination: two bodies arranged in axially spaced relationship to each other and to be connected to each other, disc-shaped means of viscous-elastic material interposed between said two bodies, first and second supporting disc means arranged in spaced relationship to each other in the axial direction of said two bodies and embedded in said disc-shaped means of viscous-elastic material, said first supporting disc means being arranged between one of said bodies and said second supporting disc means, said second supporting disc means being located between the other one of said bodies and said first supporting disc means, first rigid connecting means rigidly connecting said other one of said two bodies to said first supporting disc means, and second rigid connecting means rigidly connecting said one of said bodies to said second supporting disc means, said first and second connecting means forming a pull connection tensioned under pre-load by said viscous-elastic material whereby arising forces are compensated without any damage to the connection and supporting means.

2. An oscillation insulator in combination according to claim 1, in which said viscous-elastic material is rubber material.

3. An oscillation insulator in combination according to claim 2, in which said pull connection includes bushings respectively connected to said first and second supporting disc means, and tension bolts in said bushings.

4. An oscillation insulator in combination according to claim 3, in which said tension bolts threadedly engage said bushings.

5. An oscillation insulator in combination according to claim 4, in which one of said bodies is a mobile body and the other one of said bodies is a fixed body, and in which the tension bolts associated with said fixed body slidingly engage the pertaining bushings and are screwed into said fixed body, whereas the tension bolts associated with said mobile body threadedly engage the pertaining bushings.

6. An oscillation insulator in combination to claim 5, in which first and second supporting disc means and their bushings are vulcanized into said disc-shaped elastic means forming a bed of rubber material.

7. An oscillation insulator in combination according to claim 5, which includes three disc-shaped means of viscous-elastic material and in which said first and second supporting disc means are arranged between said three disc-shaped means, and in which said bushings extend into a portion of the disc-shaped means located between said first and second supporting disc means as well as of the adjacent one of said first and second supporting disc means and of the adjacent disc-shaped means of viscous-elastic material.

8. An oscillation insulator in combination according to claim 7, in which said first and second bodies are tubular bodies.

* * * * *